United States Patent
Miyakoshi et al.

[11] Patent Number: 5,747,396
[45] Date of Patent: May 5, 1998

[54] GLASS AND CERAMIC SUBSTRATE USING THE SAME

[75] Inventors: Toshinobu Miyakoshi; Hiroaki Hasegawa, both of Chiba, Japan

[73] Assignee: TDK Corporation, Tokyo, Japan

[21] Appl. No.: 798,103

[22] Filed: Feb. 12, 1997

[30] Foreign Application Priority Data

Feb. 29, 1996 [JP] Japan ................................. 8-043745
Dec. 3, 1996 [JP] Japan ................................. 8-337444

[51] Int. Cl.[6] .......................... C03C 14/00; C03C 3/091
[52] U.S. Cl. ........................ 501/32; 501/66; 501/67; 501/69; 501/70; 501/72
[58] Field of Search ........................ 501/32, 66, 67, 501/69, 70, 72

[56] References Cited

U.S. PATENT DOCUMENTS

| | | | |
|---|---|---|---|
| 4,749,665 | 6/1988 | Yano et al. | 501/66 |
| 4,824,806 | 4/1989 | Yokoi et al. | 501/66 |
| 5,610,108 | 3/1997 | Watzke et al. | 501/66 |
| 5,633,090 | 5/1997 | Rodek et al. | 501/69 |

FOREIGN PATENT DOCUMENTS

| | | |
|---|---|---|
| 62-113758 | 5/1987 | Japan . |
| 62-292654 | 12/1987 | Japan . |
| 63-79739 | 4/1988 | Japan . |
| 3-40933 | 2/1991 | Japan . |
| 3-218944 | 9/1991 | Japan . |
| 3-252353 | 11/1991 | Japan . |
| 4-89328 | 3/1992 | Japan . |

*Primary Examiner*—Karl Group
*Attorney, Agent, or Firm*—Oblon, Spivak, McClelland, Maier & Neustadt, P.C.

[57] ABSTRACT

A borosilicate glass composition comprising 55–67 mol % of $SiO_2$, 3–11 mol % of $Al_2O_3$, 16–26 mol % of $B_2O_3$, and 3–11 mol % of at least one oxide of SrO, CaO, MgO and ZnO is useful in the preparation of ceramic substrates. Since the amount of orthoboric acid formed on the glass in contact with humid air is minimized, the glass gives rise to little trouble in the manufacture of ceramic substrates. Ceramic compositions using the glass and a filler can be fired at low temperatures into sintered substrates which are characterized by a low dielectric constant, low dielectric dissipation factor, and high flexural strength.

10 Claims, 1 Drawing Sheet

GLASS AND CERAMIC SUBSTRATE USING THE SAME

BACKGROUND OF THE INVENTION

1. Field of the Invention

This invention relates to a chemically stable glass composition for use in glass/ceramic composite substrates and a low-temperature firing ceramic substrate using the glass composition and featuring a low dielectric constant, low dielectric dissipation factor, and practically acceptable flexural strength.

2. Prior Art

In accordance with the recent development of computers toward higher speeds and commercial electronic equipment toward higher frequencies, the following requirements are imposed on multilayer ceramic substrates commonly used therein in order to increase the speed of circuit signal transfer. Ceramic substrates should have (a) a low dielectric constant, (b) a low dielectric loss, (c) a low firing temperature enough to permit co-firing so that a conductor having a low resistance and a low melting point can be used as a circuit wiring material, and (d) a high flexural strength so that the substrate can physically retain circuits.

Such requirements are met by a multilayer ceramic substrate using as a glass component borosilicate glass having a low dielectric constant and a low melting point as disclosed in JP-A 113758/1987. This borosilicate glass contains 18 to 35 wt % (about 27.1 to 33.3 mol %) of $SiO_2$, 50 to 72 wt % (about 48.1 to 52.6 mol %) of $Al_2O_3$, 4 to 27.5 wt % (about 13.8 to 16.0 mol %) of CaO+MgO, and up to 15 wt % (about 4.1 to 8.5 mol %) of $B_2O_3$ when fillers are mixed.

Several problems arise when multilayer ceramic substrates are prepared using the prior art borosilicate glass.

In general, borosilicate glass contains $SiO_2$ and $B_2O_3$ as major components. Among the major components, $B_2O_3$ is chemically unstable and tends to react with moisture in air to form orthoboric acid ($H_3BO_3$). The thus formed orthoboric acid gives rise to a handling problem in the manufacture of multilayer ceramic substrates. For example, in the process of manufacturing multilayer ceramic substrates, orthoboric acid can form on the surface of green sheets as shaped from the glass and impede the bonding between subsequently laminated sheets. Even when the sheets are closely bonded, the resulting substrate becomes porous due to decomposition and evaporation of orthoboric acid. This raises a reliability problem.

SUMMARY OF THE INVENTION

Therefore, an object of the invention is to provide a chemically stable borosilicate glass which hinders formation of orthoboric acid.

Another object of the invention is to provide a ceramic substrate using the glass.

A further object of the invention is to provide a ceramic substrate featuring a low dielectric constant, low dielectric dissipation factor, low firing temperature, practically acceptable flexural strength, and high insulation resistance and thus suitable for use as a high-frequency circuit substrate.

Through research works on borosilicate glass, we have found that although $B_2O_3$ essential for the glass composition forms a corresponding amount of orthoboric acid, the amount of orthoboric acid formed can be reduced by adding an appropriate amount of an oxide of a specific element, typically an alkaline earth element.

According to a first aspect of the invention, there is provided a glass composition for substrates comprising 55 to 67 mol % of silicon oxide, 3 to 11 mol % of aluminum oxide, 16 to 26 mol % of boron oxide, and 3 to 11 mol % of at least one oxide selected from the group consisting of strontium oxide, calcium oxide, magnesium oxide, and zinc oxide. Herein, the molar percents of the respective oxides are calculated as $SiO_2$, $Al_2O_3$, $B_2O_3$, SrO, CaO, MgO, and ZnO, respectively. Preferably the glass composition further contains up to 3 mol % of antimony oxide calculated as $Sb_2O_3$.

According to a second aspect of the invention, there is provided a ceramic substrate comprising a glass composition as defined above and a filler.

In one preferred embodiment, the ceramic substrate consists essentially of 65 to 85 vol % of the glass composition and the balance of the filler which is selected from the group consisting of strontium feldspar, alpha-quartz, alumina, mullite, and mixtures thereof. Further preferably, the filler is strontium feldspar containing silicon oxide, strontium oxide and aluminum oxide in such amounts that provided that silicon oxide, strontium oxide and aluminum oxide are converted into $SiO_2$, SrO, and $Al_2O_3$, respectively, and X is a molar fraction of $SiO_2$, Y is a molar fraction of SrO, and Z is a molar fraction of $Al_2O_3$, wherein X+Y+Z=1, the molar fractions X, Y and Z fall in the region defined and encompassed by triangle ABC in a ternary composition diagram: A (X: 0.72, Y: 0.14, Z: 0.14), B (X: 0.60, Y: 0.25, Z: 0.15), and C (X: 0.60, Y: 0.10, Z: 0.30).

With respect to characteristics, the ceramic substrate preferably has a dielectric constant of up to 5.3 at 1 MHz, a dielectric dissipation factor of up to 0.1% at 1 MHz, a flexural strength of at least 130 MPa, and a coefficient of thermal expansion of at least $4.0 \times 10^{-6}$/K. Also preferably, the ceramic substrate has been fired at a temperature of not higher than 950° C.

BENEFITS

The borosilicate glass of the invention is a composition containing 55 to 67 mol % of $SiO_2$, 3 to 11 mol % of $Al_2O_3$, 16 to 26 mol % of $B_2O_3$, and 3 to 11 mol % of at least one oxide of SrO, CaO, MgO, and ZnO, provided that the respective oxides are stoichiometrically expressed. This formulation is effective for suppressing formation of orthoboric acid. By adding 3 mol % or less of $Sb_2O_3$ to the glass composition, the glass transition temperature (Tg) of the glass composition can be reduced so that the composition may be fired at a lower temperature. When $Sb_2O_3$ is added, the amount of $B_2O_3$ having a function of a low-temperature firing agent can be accordingly reduced, with a better result that formation of orthoboric acid is further suppressed.

It is noted that JP-A 113758/1987 discloses in Examples borosilicate glass compositions containing 50 to 54.4 wt % (about 51.6 to 59.6 mol %) of $SiO_2$, 11.9 to 15 wt % (about 7.6 to 9.0 mol %) of $Al_2O_3$, 0 to 27.3 wt % (0 to about 30.8 mol %) of CaO, 0 to 16.7 wt % (0 to about 25.0 mol %) of MgO, 8.2 to 16.7 wt % (about 7.4 to 14.5 mol %) of $B_2O_3$, and up to 1.8 wt % (up to about 1.9 mol %) of $Na_2O+K_2O$. The benefits of the present invention are not achievable with the composition of this reference. Also, JP-A 40933/1991 discloses a substrate-forming glass composition obtained by adding up to 0.5% by weight of $Sb_2O_3$ to non-borosilicate glass free of boron. This reference describes that $Sb_2O_3$ is not an essential component, but may be used as a clearing agent and that a content of more than 0.5% undesirably invites drawbacks such as coloring. This suggests that the function of $Sb_2O_3$ in the reference is completely different from that in the present invention.

The ceramic substrate comprising the above-defined glass composition according to the invention has advantages including chemical stability, high flexural strength, and a low dielectric constant.

A ceramic substrate composition consisting essentially of 65 to 85 vol % of the borosilicate glass of the invention and the balance of at least one filler selected from strontium feldspar, alpha-quartz, alumina, and mullite can be fired at low temperature into a ceramic substrate which has a practically acceptable flexural strength, low dielectric constant, low dielectric dissipation factor, high insulation resistance, and high breakdown voltage.

The ceramic substrate can have a dielectric constant of up to 5.3 at 1 MHz, which allows circuit signals to be transferred at a higher speed suitable for operation in a high frequency region. The ceramic substrate can have a dielectric dissipation factor of up to 0.1% at 1 MHz, which allows circuit signals to be transferred at a higher speed suitable for operation in a high frequency region. The ceramic substrate can have a flexural strength of at least 130 MPa, which renders the substrate more reliable. The ceramic substrate can have a coefficient of thermal expansion of at least $4.0 \times 10^{-6}$/K, which means a little difference in coefficient of thermal expansion between the substrate and an internal conductor pattern, which is, in turn, effective for reducing stresses and crack occurrence.

The firing temperature can be 950° C. or lower, which permits the substrate to be co-fired with a low-resistance wiring conductor having a low melting point.

BRIEF DESCRIPTION OF THE DRAWINGS

The only FIGURE.

DESCRIPTION OF THE PREFERRED EMBODIMENT

Glass for substrates

Figure 1:
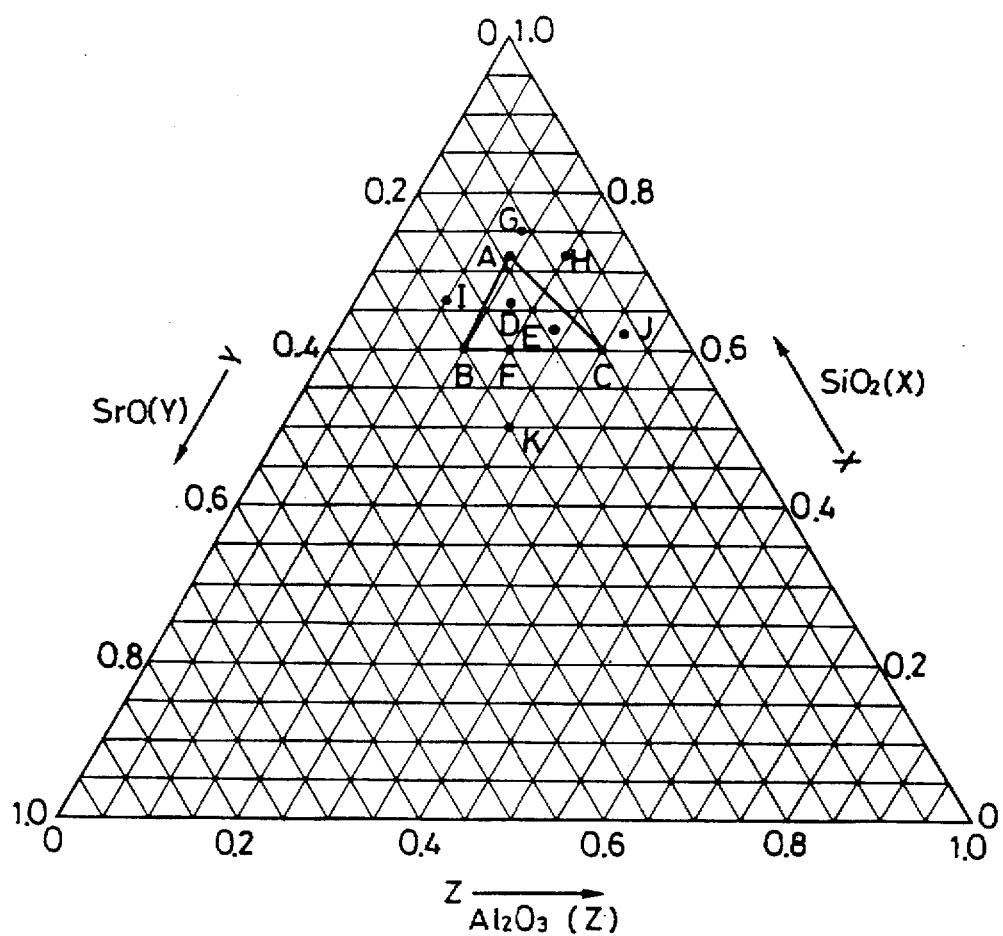
FIG. 1 is a ternary composition diagram showing the composition of strontium feldspar used as one component of a ceramic substrate composition according to the invention.

A glass composition for substrates according to the invention is classified as borosilicate glass.

The borosilicate glass composition of the invention contains silicon oxide, aluminum oxide, boron oxide, and at least one oxide selected from the group consisting of strontium oxide, calcium oxide, magnesium oxide, and zinc oxide. When the respective components are converted into stoichiometric oxides, the composition contains 55 to 67 mol % of $SiO_2$, 3 to 11 mol % of $Al_2O_3$, 16 to 26 mol % of $B_2O_3$, and total amount of 3 to 11 mol % of SrO, CaO, MgO and ZnO.

The contents of the respective components are limited for the following reason. First, the major components of the present borosilicate glass, that is, $SiO_2$, $Al_2O_3$, and $B_2O_3$ are described.

$SiO_2$ forms a glass skeleton. Outside the range of 55 to 67 mol %, glass with a less content of $SiO_2$ has a higher dielectric constant whereas a larger content inhibits melting.

$Al_2O_3$ is a component for imparting chemical stability to glass and adjusting the melting temperature of glass. Outside the range of 3 to 11 mol %, glass with a less content of $Al_2O_3$ is chemically unstable whereas a larger content inhibits melting. The term "chemical stability" used herein means that although $B_2O_3$ in glass otherwise reacts with moisture in air to form orthoboric acid ($H_3BO_3$), formation of orthoboric acid is suppressed.

$B_2O_3$ is a component for forming a glass skeleton and adjusting the melting temperature of glass. The content of $B_2O_3$, which is determined by taking into account precipitation of orthoboric acid and a dielectric constant, is 16 to 26 mol %, preferably 18 to 23 mol %, more preferably 19.5 to 22.5 mol %. Outside the range, a less content inhibits melting whereas glass with a larger content of $B_2O_3$ is less chemically stable.

Next, the remaining components are described.

SrO is a component for imparting chemical stability to glass and adjusting the electrical properties of glass. Outside the range of 3 to 11 mol %, glass with a less content of SrO is chemically unstable whereas glass with a larger content has a higher dielectric constant.

CaO is a component for imparting chemical stability to glass. Outside the range of 3 to 11 mol %, glass with a larger content of CaO tends to devitrify or crystallize and when used as a raw material for a ceramic substrate composition, inhibits firing of the composition. Glass with a less content of CaO is chemically unstable.

Like SrO, ZnO is effective for imparting chemical stability to glass and reducing a dielectric constant.

MgO is effective for increasing a coefficient of expansion and reducing a dielectric constant.

One or more of SrO, CaO, MgO and ZnO may be used while a mixture of two or more such components may have any desired mix ratio. In one preferred embodiment, CaO is essential and the total content of CaO and at least one of SrO, MgO and ZnO is 3 to 11 mol % of the glass composition.

When a substrate-forming composition contains borosilicate glass of the above-mentioned composition, a chemically stable substrate can be produced therefrom while suppressing formation of orthoboric acid. Preferably the borosilicate glass of the invention further contains $Sb_2O_3$ for the following reason.

$Sb_2O_3$ is effective for reducing a firing temperature. As mentioned previously, glass becomes chemically unstable when $B_2O_3$ in its composition reacts with moisture in air to form orthoboric acid ($H_3BO_3$). Then careful handling is needed in the manufacture of substrates. In this regard, the glass composition according to the invention is effective for suppressing formation of orthoboric acid ($H_3BO_3$) and has a relatively low content of $B_2O_3$. Glass with a lower content of $B_2O_3$, however, has a higher Tg which is unsuitable for low-temperature firing purposes. It is then preferred to add $Sb_2O_3$ serving as a low-temperature sintering aid to compensate for a drop of Tg. The amount of $Sb_2O_3$ added is up to 3 mol %, more preferably 0.1 to 3 mol %, most preferably 0.1 to 2.5 mol % of the glass composition. Glass with more than 3 mol % of $Sb_2O_3$ would have a higher dielectric constant and be unsuitable as a high-frequency circuit substrate material.

In addition to the above-mentioned essential and optional components, the glass of the invention may further contain $Na_2O$, $Fe_2O_3$, $ZrO_2$, etc., typically in an amount of 0.2 to 0.5% by weight. These components originate from impurities in raw materials and do not adversely affect the desired properties insofar as their content is limited to such an order.

Filler

A ceramic substrate composition according to the invention contains borosilicate glass of the above-defined composition and a filler. Preferably, the substrate composition consists essentially of 65 to 85 vol % of the glass and the balance (35 to 15 vol %) of the filler. Any of commonly used fillers may be used although the filler is preferably selected from the group consisting of strontium feldspar, alpha-quartz, alumina, and mullite.

Strontium feldspar is a ternary inorganic oxide composite generally known as barium feldspar or celsian (BaO.Al$_2$O$_3$.2SiO$_2$) wherein Ba is replaced by Sr. Strictly stated, barium feldspar or celsian represents a region in the equilibrium diagram of a BaO—Al$_2$O$_3$—SiO$_2$ system where BaO.Al$_2$O$_3$.2SiO$_2$ can exist. As used herein, strontium feldspar is broadly defined as representing not only a region in the equilibrium diagram of a SrO—Al$_2$O$_3$—SiO$_2$ system where SrO.Al$_2$O$_3$.2SiO$_2$ can exist, but also another region. Included are inorganic oxide composites in a region where SrO.Al$_2$O$_3$.2SiO$_2$ can exist. Differently stated, strontium aluminosilicate compositions consisting of SrO, Al$_2$O$_3$, and SiO$_2$ are included.

FIG. 1 is a ternary composition diagram of a SiO$_2$—SrO—Al$_2$O$_3$ system. In the diagram, the composition of strontium feldspar is shown by the region represented by a triangle. More specifically, strontium feldspar contains silicon oxide, strontium oxide and aluminum oxide. Assume that silicon oxide, strontium oxide and aluminum oxide are converted into SiO$_2$, SrO, and Al$_2$O$_3$, respectively. X, Y, and Z are molar fractions of SiO$_2$, SrO, and Al$_2$O$_3$, respectively, with the proviso that X+Y+Z=1. The molar fractions X, Y and Z fall in the region defined and encompassed by triangle ABC in the ternary composition diagram: point A having X=0.72, Y=0.14, and Z=0.14, point B having X=0.60, Y=0.25, Z=0.15, and point C having X=0.60, Y=0.10, Z=0.30. Both the inside of triangle ABC and lines AB, BC and CA are inclusive.

Strontium feldspar of a composition outside the above-defined region is undesirable because of residual cristobalite left after preparation and a higher firing temperature. Cristobalite can cause cracking in subsequent firing and soldering of substrates.

Strontium feldspar is effective for increasing the flexural strength of a ceramic substrate. Then, when strontium feldspar is used in a substrate composition, shortage of strontium feldspar results in a drop of flexural strength. However, strontium feldspar also has a function of increasing a dielectric constant and a firing temperature. Then, if strontium feldspar is added more than necessity, there result a higher dielectric constant and a higher firing temperature. The preferred amount of strontium feldspar added is the balance (15 to 35 vol %) of the substrate composition containing the glass component although the amount of strontium feldspar added is generally 0 to 35 vol %.

Alpha-quartz is effective for reducing a dielectric constant. Then a dielectric constant can be controlled by adding α-quartz. α-quartz is also effective for decreasing the flexural strength of a ceramic substrate. Then adding α-quartz more than necessity would undesirably invite a drop of flexural strength. The preferred amount of α-quartz added is the balance (15 to 35 vol %) of the substrate composition containing the glass component although the amount of α-quartz added is generally 0 to 35 vol %.

Alumina has similar functions to strontium feldspar, that is, functions of increasing the flexural strength of a ceramic substrate, increasing a dielectric constant and increasing a firing temperature. Then, when alumina is used in a substrate composition, shortage of alumina results in a drop of flexural strength. If alumina is added more than necessity, there result a higher dielectric constant and a higher firing temperature. The preferred amount of alumina added is the balance (15 to 35 vol %) of the substrate composition containing the glass component although the amount of alumina added is generally 0 to 20 vol %.

It is noted that alumina is also contained as a component of the glass according to the invention. In a substrate as fired, alumina as a filler component and alumina as a glass component do not interact with each other. It never happens that alumina in either one of the glass and filler diffuses to vary the content of alumina in the other. This is also true for Si, Sr, etc. in strontium feldspar and glass components.

Mullite has similar functions to strontium feldspar and alumina. Similar care must be taken when mullite is added. The preferred amount of mullite added is the balance (15 to 35 vol %) of the substrate composition containing the glass component although the amount of mullite added is generally 0 to 30 vol %.

One or more members are selected from these fillers for adjusting flexural strength, dielectric constant and the like for a particular application of ceramic substrate. A mixture of two or more fillers in any desired mix ratio may be used. The (total) amount of the filler or fillers is preferably 15 to 35 vol % of the substrate composition.

Preparation methods

The method of preparing the borosilicate glass according to the invention is not critical. In one exemplary method, raw materials used are oxides of relevant elements or compounds of relevant elements which can be converted into oxides through heat treatment such as carbonates and hydroxides. These raw materials are weighed and mixed so that the final composition after firing may fall in the range defined in the present invention. The mixture is melted in a crucible at about 1,500° to 1,600° C. for about ½ to 5 hours, for example, granulated in water, and pulverized in a ball mill, yielding borosilicate glass powder which is ready for use as a glass component for a ceramic substrate composition. The borosilicate glass powder is preferably in a finely pulverized state having a mean particle size of up to 3 μm, more preferably 1 to 2.5 μm. A too larger mean particle size would adversely affect flexural strength whereas a too smaller mean particle size would cause green sheets to crack, failing to produce sound green sheets.

As to the fillers except for strontium feldspar, a powder raw material ready for use in ceramic substrate compositions can be obtained simply by milling a commercially available product in a ball mill. There is no need to specially synthesize a filler. For the same reason as in the case of borosilicate glass powder, the filler powder is preferably in a finely pulverized state having a mean particle size of up to 3 μm, more preferably 1.5 to 2.5 μm.

Strontium feldspar is prepared, for example, using oxides of relevant elements, SiO$_2$, Al$_2$O$_3$, SrO, etc. or compounds of relevant elements which can be converted into oxides through heat treatment such as carbonates and hydroxides. These raw materials are weighed and mixed so that the final composition after firing may fall in the above-defined range. The mixture is fired in a crucible at about 1,300° to 1,400° C. for about 2 hours, for example, yielding strontium feldspar. It is further pulverized in a ball mill, yielding strontium feldspar powder which is ready for use as a filler for a ceramic substrate composition. For the same reason as in the case of borosilicate glass powder, the strontium feldspar powder is preferably in a finely pulverized state having a mean particle size of up to 3 μm, more preferably 1.5 to 2.5 μm.

With respect to α-quartz, a powder raw material ready for use in ceramic substrate compositions can be obtained simply by milling a commercially available product in a ball mill. For the same reason as in the case of borosilicate glass powder, the α-quartz powder is preferably in a finely pulverized state having a mean particle size of up to 3 μm, more preferably 1.5 to 2.5 μm.

A ceramic substrate is generally prepared by the following procedure.

The respective raw materials (glass and filler) as pulverized are weighed so that the final composition after firing may fall in the range defined according to the invention. Using a porcelain ball mill, for example, the raw materials are mixed with an organic vehicle. This mixing method may be any of commonly used mixing methods insofar as the components are uniformly dispersed as a result of thorough mixing. The organic vehicle used herein is not critical, and any of commonly used vehicles including binders, solvents and plasticizers may be used. For example, a binder may be selected from polyvinyl butyral (PVB), ethyl cellulose, and acrylic resins alone or in admixture, and is generally used in an amount of about 7 to 20 parts by weight per 100 parts by weight of the ceramic substrate composition powder components. A solvent may be selected from alcohols such as methanol, ethanol, propanol, and butanol, toluene, xylene, methyl ethyl ketone, and acetone alone or in admixture, and is generally used in an amount of about 40 to 60 parts by weight per 100 parts by weight of the ceramic substrate composition powder components. A plasticizer may be selected from diethyl phthalate (DEP), dibutyl phthalate (DBP), dioctyl phthalate (DOP), n-butylphthalyl n-butyl glycolate (BPBG) alone or in admixture, and is generally used in an amount of about 3 to 7 parts by weight per 100 parts by weight of the ceramic substrate composition powder components. The organic vehicles and other additives used for similar purposes are not critical and may be used as desired.

After the ceramic substrate composition is uniformly mixed together with the organic vehicle in a ball mill as mentioned just above, it is formed into green sheets of a predetermined gage for a particular purpose. The green sheets are further processed as by drilling through-holes and forming circuits for an intended product. The green sheets are then stacked as desired. No particular limits are imposed on the preparation of green sheets, formation of circuits, and lamination. Any conventional methods may be used. For example, a doctor blade method may be used to form green sheets; a screen printing method may be used to form circuits including resistors, capacitors, and wiring conductors; and a pressure bonding method may be used to complete a laminate.

In connection with the formation of circuits, low-resistance conductors are used as a wiring conductor. Metal materials such as silver (Ag), silver-palladium (Ag-Pd), silver-platinum (Ag-Pt), and gold (Au) are useful, with silver being preferred. Use of a low-resistance wiring conductor is preferred for a speedup of circuit signal transfer because a substrate featuring a reduced signal transfer delay time, low noise, and superior high-frequency pulse follow-up can be formed. Also resistor materials such as $RuO_2$ and SiC system materials and capacitor materials such as $BaTiO_3$ and $SrTiO_3$ system materials are used to form circuits.

Green sheets having circuits formed thereon or a laminate thereof is then fired at a temperature of 950° C. or lower, preferably 920° C. or lower, especially 870° to 900° C. for about ¼ to 1 hour. Firing temperatures above 950° C. can cause the low-resistance wiring conductor having a low melting point to diffuse whereas too low firing temperatures result in sintered substrates with a lower density.

Characteristics of glass and ceramic substrate

In the borosilicate glass of the invention, the amount of orthoboric acid formed should desirably be 350 ppm or less, especially 200 ppm or less, as quantitatively determined by a method to be described later. As previously mentioned, an undesirable problem arises if much orthoboric acid forms when borosilicate glass is allowed to stand in a humid atmosphere. $B_2O_3$ in glass at the surface of sheets can react with moisture in the atmosphere to form orthoboric acid on the sheet surface. This orthoboric acid is deleterious in laying up the sheets to prepare a ceramic substrate. The glass in which the amount of orthoboric acid formed is less than 350 ppm does not raise substantial problems inconvenient for substrate manufacture and characteristics because little orthoboric acid forms on the sheet surface even when sheets are allowed to stand for a certain time prior to preparation of a substrate. These problems are completely overcome when the amount of orthoboric acid formed is limited to less than 200 ppm.

The glass should preferably have a low dielectric constant since the dielectric constant of glass affects the dielectric constant of a ceramic substrate. Preferably the glass of the invention has a dielectric constant of 5.1 or lower, more preferably 4.0 to 5.0.

Preferably the ceramic substrate of the invention has a dielectric constant of 5.3 or lower at 1 MHz, more preferably about 4.8 to 5.2 at 1 MHz. The ceramic substrate should preferably have a dielectric dissipation factor of up to 0.1% at 1 MHz. In general, the delay time of high-frequency signals is proportional to a square root of a dielectric constant. For speedup of circuit signal transfer, it is necessary not only to reduce the resistance of a wiring conductor, but also to reduce the dielectric constant of a ceramic substrate.

The ceramic substrate should preferably have a flexural strength of at least about 130 MPa, more preferably 130 to 180 MPa, most preferably 160 to 180 MPa. A too low flexural strength means a shortage of mechanical strength, which adversely affects the reliability and handling of a substrate.

The ceramic substrate should preferably have a coefficient of thermal expansion of at least $4.0 \times 10^{-6}$/K. A higher coefficient of thermal expansion is preferred because silver used as a conductor has a coefficient of thermal expansion of about $20 \times 10^{-6}$/K. No upper limit is imposed on the coefficient of expansion of a ceramic substrate. When a conductor pattern is formed on a ceramic substrate, the substrate can be excessively stressed and even cracked if there is a substantial difference in coefficient of thermal expansion between the substrate and the conductor. As the pattern of internal conductor becomes more complex, the ceramic substrate is desired to have a higher coefficient of thermal expansion. It is noted that a higher coefficient of thermal expansion is achievable by increasing the content of $\alpha$-quartz. However, if the content of $\alpha$-quartz is increased too much, the ceramic substrate increases a coefficient of thermal expansion at the sacrifice of flexural strength. A too much content of strontium feldspar leads to a lower coefficient of thermal expansion.

EXAMPLE

Examples of the invention are given below by way of illustration and not by way of limitation.

Example 1

Samples
Glass

Raw materials (oxides) were weighed and mixed in a shaking mixer so that a final composition as shown in Table 1 might be obtained. The mixture was melted in a crucible at a temperature of 1,500° to 1,600° C. for a time of ½ to 5 hours (selected for a particular glass composition from these ranges), quench granulated in water, and pulverized in a ball mill, yielding borosilicate glass powder having a mean particle size of about 1.9 μm. In this way, borosilicate glass powder samples designated Nos. 1 to 12 were obtained as shown in Table 1. Among these, sample Nos. 11 and 12 are comparative samples.

Ceramic substrate

The borosilicate glass powder samples used were Nos. 1, 3, 6, 8, 11 and 12. The raw materials used as the filler were alumina, mullite, α-quartz, and strontium feldspar. The alumina having a density of 3.98 g/cm$^3$ was a commercially available product AL41DBM from Sumitomo Chemical K. K. which had a pre-controlled particle size of 1.3 μm so that pulverization was no longer necessary. The mullite having a density of 3.15 g/cm$^3$ and α-quartz having a density of 2.65 g/cm$^3$ (Hisilica from Nicchitsu Industry K. K.) were pulverized to a mean particle size of about 2.0 μm. The strontium feldspar having a density of 2.88 g/cm$^3$ was synthesized and included powder samples A to F as shown in Table 2. For example, strontium feldspar powder sample E was prepared by weighting and mixing $SiO_2$, $Al_2O_3$, and SrO such that a final composition might consist of 63 mol % of $SiO_2$, 23 mol % of $Al_2O_3$, and 14 mol % of SrO after firing, and firing the mixture in a crucible at 1,300° to 1,450° C. for 2 hours. The fired product was milled in a ball mill to a mean particle size of about 2.0 μm.

The borosilicate glass powder and the filler or fillers were weighed and mixed so as to give a final composition as shown in Tables 3, 4, and 5. To 100 parts by weight of a mixture of borosilicate glass powder and filler was added an organic vehicle containing 15 parts by weight of an acrylic resin as a binder, 50 parts by weight of toluene as a solvent, and 5 parts by weight of BPBG as a plasticizer. From the resulting composition, green sheets with a gage of 0.2 to 0.25 mm were formed by a doctor blade method. The sheets were cut to a suitable size for each test and fired. For some tests, silver electrodes were formed on sheets.

Tests

Quantitative determination of orthoboric acid

The amount of orthoboric acid was quantitatively determined by pulverizing 2 grams of glass powder to a mean particle size of 1.9 μm, allowing the powder to stand in a humid atmosphere for 24 hours, extracting the end material, orthoboric acid with 40 ml of water, and effecting inductively coupled plasma (ICP) atomic emission spectrometry (sequential plasma emission analyzer ICPS-1000II by Shimazu Mfg. K. K.).

Dielectric constant (ε) and dielectric dissipation factor (tan δ)

Dielectric constant was determined by punching discs of 30 mm diameter from a green sheet of 0.2 to 0.25 mm thick prepared as above, laying 6 or 7 discs one on top of another, and heat compression bonding the laminate at a temperature of 80° C. and a pressure of 50 MPa. The laminate was fired in air at 870° to 950° C. for 20 to 30 minutes. Silver electrodes with a diameter of 19 mm and 20 mm were formed on front and back surfaces of the fired laminate, obtaining a test block. Each electrode was formed by applying a silver paste and baking. The test block was measured for capacitance at a frequency of 1 MHz by means of an LCR meter (HP-4284A by Hewlette Packard). A dielectric constant was calculated from the effective electrode area of the test block, the spacing between electrodes (equal to the thickness of the block), and the capacitance. A dielectric dissipation factor was conventionally measured using the same meter.

Flexural strength (FS)

Flexural strength was determined according to JIS R-1601, a test for determining the flexural strength of fine ceramics. A test specimen was prepared by cutting a green sheet of 0.2 to 0.25 mm thick prepared as above into rectangular sections of 45 mm×15 mm, laying 15 to 18 sections one on top of another, and heat compression bonding the laminate at a temperature of 80° C. and a pressure of 50 MPa. The laminate was fired in air at 870° to 950° C. for 20 to 30 minutes. The sintered body was shaped to the prescribed dimensions of 38 mm long by 4 mm wide by 3 mm thick. The specimen was examined by a three point bending test of moving a cross head at a speed of 0.5 mm/min. to apply a load. A rupture load was measured.

Volume resistivity

Volume resistivity was determined by forming a silver electrode on either surface of a sintered disc as prepared in the dielectric constant measurement and measuring the resistance of the disc by means of an insulation resistance meter (HP-4329A by Hewlette Packard) while applying DC 500 V across the disc for 1 minute.

Density

Density was calculated from a measurement according to JIS C-2141 (1992).

Glass transition temperature (Tg)

Glass transition temperature was measured by a conventional method.

Coefficient of thermal expansion (α)

As in the flexural strength measurement, a test specimen was prepared by cutting a green sheet of 0.2 to 0.25 mm thick into rectangular sections of 45 mm×15 mm, laying 15 to 18 sections one on top of another without forming a circuit, and heat compression bonding the laminate at a temperature of 80° C. and a pressure of 50 MPa. The laminate was fired in air at 870° to 950° C. for 20 to 30 minutes. The sintered body was shaped to the prescribed dimensions of 38 mm long by 4 mm wide by 3 mm thick. The specimen was measured for a coefficient of thermal expansion while heating it.

Test results

Table 1 shows the measurement results of orthoboric acid amount, dielectric constant (ε), Tg, and density of twelve borosilicate glass samples, Nos. 1 to 12.

As seen from Table 1, the glass of sample No. 11 having a higher content of $B_2O_3$ outside the scope of the invention formed more than 350 ppm of orthoboric acid. This glass undesirably gave rise to problems inconvenient for substrate preparation and characteristics because orthoboric acid formed on the surface of sheets prior to lamination of sheets into a substrate. The glass of sample No. 12 had high Tg and undesirably required a higher temperature in firing a mixture thereof with a filler.

Table 2 shows the composition and properties of strontium feldspar. The strontium feldspar samples shown in Table 2 are shown as points in the ternary composition diagram of FIG. 1.

With respect to twenty five ceramic substrates, Tables 3, 4, and 5 show the borosilicate glass, type of filler (including alumina, mullite, strontium feldspar, and α-quartz), blending percents thereof, firing temperature, dielectric constant (ε), dielectric dissipation factor (tan δ), flexural strength (FS), coefficient of thermal expansion (α), and adhesion. Note that the dielectric constant and dielectric dissipation factor are measurements at 1 MHz. The adhesion was examined by forming a laminate as in the measurement of a coefficient of thermal expansion except that a coil of silver was printed on a sheet as an inductor. A fired product was examined and rated "X" (rejected) when gaps were found between laid-up sheets, especially near the silver circuit and "O" (passed) when no gaps were found. It is noted that all ceramic substrates had a volume resistivity of more than $10^{15}$ Ω·cm.

As seen from Tables 3 to 5, sample Nos. 101 and 102 used alumina as the filler and sample Nos. 103 and 104 used mullite as the filler. Too much contents of these fillers resulted in higher dielectric constants. Sample Nos. 105 to 110 used strontium feldspar and alpha-quartz in a varying ratio as the filler. Sample Nos. 111 to 115 contained a varying amount of glass, indicating that a too small amount of glass required a higher firing temperature and a too large amount of glass resulted in lower flexural strength. Sample Nos. 116 to 120 used different types of glass. Sample Nos. 121 to 125 contained different types of strontium feldspar.

TABLE 1

Borosilicate glass

| Sample No. | Composition (mol %) | | | | | | | | Density (g/cm³) | $\epsilon$ | Tg (°C.) | o-boric acid (ppm) |
|---|---|---|---|---|---|---|---|---|---|---|---|---|
| | $SiO_2$ | $Al_2O_3$ | $B_2O_3$ | SrO | CaO | MgO | ZnO | $Sb_2O_3$ | | | | |
| 1 | 67.0 | 4.0 | 25.0 | 3.0 | — | — | — | 1.0 | 2.32 | 4.2 | 626 | 251 |
| 2 | 65.0 | 3.0 | 24.5 | — | 5.5 | — | — | 2.0 | 2.41 | 4.4 | 618 | 239 |
| 3 | 62.5 | 9.0 | 22.0 | — | 6.5 | — | — | — | 2.27 | 4.6 | 663 | 147 |
| 4 | 62.5 | 9.0 | 22.0 | — | 3.5 | 3.0 | — | — | 2.41 | 4.6 | 656 | 162 |
| 5 | 62.5 | 7.0 | 21.0 | 1.5 | 3.5 | 2.5 | — | 2.0 | 2.47 | 4.7 | 632 | 139 |
| 6 | 62.5 | 7.0 | 21.0 | 1.5 | 3.5 | 1.5 | 1.0 | 2.0 | 2.42 | 4.7 | 627 | 143 |
| 7 | 62.0 | 10.0 | 16.0 | 5.0 | 2.0 | — | 2.0 | 3.0 | 2.61 | 5.0 | 653 | 119 |
| 8 | 61.0 | 8.0 | 21.5 | 4.0 | 3.0 | 1.0 | 1.0 | 0.5 | 2.32 | 4.8 | 655 | 148 |
| 9 | 57.0 | 8.0 | 24.0 | 4.0 | 6.0 | 1.0 | — | — | 2.23 | 4.9 | 664 | 217 |
| 10 | 55.0 | 8.5 | 25.5 | 6.5 | 1.5 | 3.0 | — | — | 2.41 | 4.8 | 653 | 268 |
| 11* | 58.0 | 9.0 | 26.5* | — | 6.5 | — | — | — | 2.24 | 4.6 | 648 | 353 |
| 12* | 62.5 | 11.0 | 15.5* | — | 9.0 | 2.0 | — | — | 2.3 | 5.0 | 681 | 103 |

*outside the range of the invention

TABLE 2

Strontium feldspar

| Sample designation | Composition (molar ratio) | | | Firing temp. (°C.) | Optimum firing temp. (°C.) | Density (g/cm³) | Remarks |
|---|---|---|---|---|---|---|---|
| | $SiO_2$ | $Al_2O_3$ | SrO | | | | |
| A | 0.72 | 0.14 | 0.14 | 1350–1400 | 1380 | 2.85 | — |
| B | 0.60 | 0.15 | 0.25 | 1300–1350 | 1330 | 2.95 | — |
| C | 0.60 | 0.30 | 0.10 | 1400–1450 | 1420 | 2.95 | — |
| D | 0.66 | 0.17 | 0.17 | 1350–1400 | 1380 | 2.89 | — |
| E | 0.63 | 0.23 | 0.14 | 1350–1400 | 1380 | 2.90 | — |
| F | 0.60 | 0.20 | 0.20 | 1400–1450 | 1420 | 2.94 | — |
| G | 0.75 | 0.14 | 0.11 | 1320–1370 | — | — | cristobalite left |
| H | 0.72 | 0.20 | 0.08 | 1330–1380 | — | — | cristobalite left |
| I | 0.66 | 0.10 | 0.24 | 1080–1100 | — | — | narrow firing |
| J | 0.62 | 0.31 | 0.07 | 1470–1520 | — | — | firing temperature |
| K | 0.50 | 0.25 | 0.25 | 1470–1520 | — | — | high firing temperature |

TABLE 3

Ceramic substrate

| Sample No. | Glass | | Filler | | | Firing temp. (°C.) | $\epsilon$ | tan δ (%) | FS (MPa) | α (×10⁻⁶/K) | Adhesion |
|---|---|---|---|---|---|---|---|---|---|---|---|
| | No. | (vol %) | Type | Amount (vol %) | Type | Amount (vol %) | | | | | |
| 101 | 6 | 85 | alumina | 15 | — | — | 870 | 5.3 | 0.09 | 170 | 4.3 | ○ |
| 102** | 6 | 75 | alumina | 25 | — | — | 880 | 5.8** | 0.09 | 180 | 4.3 | ○ |
| 103 | 6 | 85 | mullite | 15 | — | — | 880 | 4.9 | 0.10 | 150 | 4.0 | ○ |
| 104** | 6 | 65 | mullite | 35 | — | — | 900 | 5.7** | 0.10 | 160 | 4.0 | ○ |
| 105 | 6 | 65 | Sr-feldspar E | 35 | α-quartz | 0 | 900 | 5.2 | 0.10 | 165 | 4.0 | ○ |
| 106 | 6 | 65 | Sr-feldspar E | 25 | α-quartz | 10 | 900 | 5.0 | 0.10 | 160 | 4.5 | ○ |
| 107 | 6 | 65 | Sr-feldspar E | 20 | α-quartz | 15 | 910 | 5.2 | 0.10 | 160 | 5.0 | ○ |

TABLE 3-continued

| Sample No. | Glass No. | Glass (vol %) | Glass Type | Filler Amount (vol %) | Filler Type | Amout (vol %) | Firing temp. (°C.) | ε | tan δ (%) | FS (MPa) | α (×10⁻⁶/K) | Adhesion |
|---|---|---|---|---|---|---|---|---|---|---|---|---|
| 108 | 6 | 65 | Sr-feldspar E | 15 | α-quartz | 20 | 920 | 4.9 | 0.10 | 160 | 5.9 | ○ |
| 109 | 6 | 65 | Sr-feldspar E | 10 | α-quartz | 25 | 930 | 4.8 | 0.10 | 155 | 6.8 | ○ |
| 110 | 6 | 65 | Sr-feldspar E | 0 | α-quartz | 35 | 950 | 4.7 | 0.10 | 140 | 7.2 | ○ |

*outside the range of the invention
**outside the preferred range of the invention,

TABLE 4

| Sample No. | Glass No. | Glass (vol %) | Glass Type | Filler Amount (vol %) | Filler Type | Amout (vol %) | Firing temp. (°C.) | ε | tan δ (%) | FS (Mpa) | α (×10⁻⁶/K) | Adhesion |
|---|---|---|---|---|---|---|---|---|---|---|---|---|
| 111 | 6 | 75 | Sr-feldspar E | 5 | α-quartz | 20 | 900 | 4.7 | 0.10 | 145 | 6.4 | ○ |
| 112 | 6 | 70 | Sr-feldspar E | 10 | α-quartz | 20 | 900 | 4.8 | 0.10 | 155 | 6.2 | ○ |
| 113** | 6 | 60** | Sr-feldspar E | 40 | α-quartz | 0 | 965** | 5.5** | 0.10 | 160 | 4.0 | ○ |
| 114** | 6 | 60** | Sr-feldspar E | 0 | α-quartz | 40 | 970** | 4.3 | 0.10 | 120** | 7.8 | ○ |
| 115** | 6 | 90** | Sr-feldspar E | 10 | α-quartz | 0 | 850 | 4.9 | 0.10 | 110** | 4.7 | ○ |
| 116 | 1 | 70 | Sr-feldspar E | 10 | α-quartz | 20 | 900 | 4.3 | 0.10 | 155 | 5.7 | ○ |
| 117* | 12* | 65 | Sr-feldspar E | 35 | α-quartz | 0 | 980** | 5.4** | 0.10 | 165 | 4.1 | ○ |
| 118 | 3 | 65 | Sr-feldspar E | 25 | α-quartz | 10 | 930 | 5.1 | 0.10 | 170 | 4.5 | ○ |
| 119 | 8 | 65 | Sr-feldspar E | 25 | α-quartz | 10 | 910 | 5.0 | 0.10 | 160 | 4.5 | ○ |
| 120* | 11* | 65 | Sr-feldspar E | 25 | α-quartz | 10 | 910 | 5.0 | 0.10 | 160 | 4.4 | X |

*outside the range of the invention
**outside the preferred range of the invention

TABLE 5

| Sample No. | Glass No. | Glass (vol %) | Glass Type | Filler Amount (vol %) | Filler Type | Amout (vol %) | Firing temp. (°C.) | ε | tan δ (%) | FS (Mpa) | α (×10⁻⁶/K) | Adhesion |
|---|---|---|---|---|---|---|---|---|---|---|---|---|
| 121 | 6 | 70 | Sr-feldspar A | 30 | α-quartz | 0 | 900 | 5.0 | 0.10 | 170 | 4.2 | ○ |
| 122 | 6 | 70 | Sr-feldspar B | 30 | α-quartz | 0 | 900 | 5.0 | 0.10 | 170 | 4.2 | ○ |
| 123 | 6 | 70 | Sr-feldspar C | 30 | α-quartz | 0 | 900 | 5.0 | 0.10 | 170 | 4.2 | ○ |
| 124 | 6 | 70 | Sr-feldspar D | 30 | α-quartz | 0 | 900 | 5.0 | 0.10 | 170 | 4.2 | ○ |
| 125 | 6 | 70 | Sr-feldspar E | 30 | α-quartz | 0 | 900 | 5.0 | 0.10 | 170 | 4.2 | ○ |

*outside the range of the invention

Ceramic substrate compositions using borosilicate glass of a composition within the scope of the invention and strontium feldspar and alpha-quartz within the scope of the invention, more particularly containing 65 to 85 vol % of borosilicate glass and the balance of at least one of strontium feldspar, alpha-quartz, alumina and mullite could be fired at a temperature of 870° to 950° C. The thus fired ceramic substrates had a dielectric constant of up to 5.3, a dielectric dissipation factor of up to 0.1%, and a flexural strength of at least 130 MPa.

In contrast, in ceramic substrates prepared using ceramic compositions outside the scope of the invention, one or more of dielectric constant, dielectric dissipation factor, and flexural strength, and adhesion were unacceptable. More specifically, sample No. 117 in Table 4 which used borosilicate glass of a composition outside the scope of the invention showed a sintering temperature and dielectric constant outside the scope of the invention. Sample Nos. 113 to 115 in Table 4 used a ceramic composition outside the scope of the invention and their sintering temperature and flexural strength were outside the scope of the invention.

It is thus evident that ceramic substrates within the scope of the invention satisfied all of the test items.

There has been described a glass which forms a minimized amount of orthoboric acid and gives rise to little trouble in the manufacture of ceramic substrates. Substrate compositions using the glass of the invention can be fired at low temperatures into ceramic substrates which are characterized by a low dielectric constant, low dielectric dissipation factor, and high flexural strength.

Although some preferred embodiments have been described, many modifications and variations may be made thereto in the light of the above teachings. It is therefore to be understood that within the scope of the appended claims, the invention may be practiced otherwise than as specifically described.

We claim:

1. A glass composition for substrates comprising 55 to 67 mol % of silicon oxide, 3 to 11 mol % of aluminum oxide, 16 to 26 mol % of boron oxide, 3 to 11 mol % of at least one oxide selected from the group consisting of strontium oxide, calcium oxide, magnesium oxide, and zinc oxide, and 1 to 3 mol % of antimony oxide, the molar percents of the respective oxides being calculated as $SiO_2$, $Al_2O_3$, $B_2O_3$, SrO, CaO, MgO, ZnO, and $Sb_2O_3$, respectively.

2. A ceramic substrate comprising the glass composition of claim 1 and a filler.

3. The ceramic substrate of claim 2 having a dielectric constant of up to 5.3 at 1 MHz.

4. The ceramic substrate of claim 2 having a dielectric dissipation factor of up to 0.1% at 1 MHz.

5. The ceramic substrate of claim 2 having a flexural strength of at least 130 MPa.

6. The ceramic substrate of claim 2 having a coefficient of thermal expansion of at least $4.0 \times 10^{-6}$/K.

7. The ceramic substrate of claim 2 which has been fired at a temperature of not higher than 950° C.

8. The ceramic substrate of claim 2 which consists essentially of 65 to 85 vol % of the glass composition and the balance of the filler which is selected from the group consisting of strontium feldspar, alpha-quartz, alumina, mullite, and mixtures thereof.

9. The ceramic substrate of claim 8 wherein the filler is strontium feldspar containing silicon oxide, strontium oxide and aluminum oxide in such amounts that provided that silicon oxide, strontium oxide and aluminum oxide are converted into $SiO_2$, SrO, and $Al_2O_3$, respectively, and X is a molar fraction of $SiO_2$, Y is a molar fraction of SrO, and Z is a molar fraction of $Al_2O_3$, wherein X+Y+Z=1, the molar fractions X, Y and Z fall in the region defined and encompassed by triangle ABC in a ternary composition diagram as set forth in FIG. 1:

A (X: 0.72, Y: 0.14, Z: 0.14),

B (X: 0.60, Y: 0.25, Z: 0.15), and

C (X: 0.60, Y: 0.10, Z: 0.30).

10. A ceramic substrate consisting essentially of (1) 65 to 85 vol % of a glass composition comprising 55 to 67 mol % of silicon oxide, 3 to 11 mol % of aluminum oxide, 16 to 26 mol % of boron oxide, and 3 to 11 mol % of at least one oxide selected from the group consisting of strontium oxide, calcium oxide, magnesium oxide, and zinc oxide, the molar percents of the respective oxides being calculated as $SiO_2$, $Al_2O_3$, $B_2O_3$, SrO, CaO, MgO, and ZnO, respectively, and (2) the balance of a filler selected from the group consisting of strontium feldspar, alpha-quartz, alumina, mullite, and mixtures thereof.

* * * * *